US012782005B2

(12) United States Patent
Sorensen et al.

(10) Patent No.: US 12,782,005 B2
(45) Date of Patent: Nov. 3, 2026

(54) ARTICULABLE SOLAR CONCENTRATOR

(71) Applicant: Flibe Energy, Inc., Huntsville, AL (US)

(72) Inventors: Kirk Frederick Sorensen, Madison, AL (US); Jared Raymond Mobley, Huntsville, AL (US); Chandon James Ivey, Madison, AL (US); Skyler Devore Allen, Madison, AL (US)

(73) Assignee: Flibe Energy, Inc., Huntsville, AL (US)

( * ) Notice: Subject to any disclaimer, the term of this patent is extended or adjusted under 35 U.S.C. 154(b) by 373 days.

(21) Appl. No.: 18/639,773

(22) Filed: Apr. 18, 2024

(65) Prior Publication Data

US 2024/0353150 A1 Oct. 24, 2024

Related U.S. Application Data

(60) Provisional application No. 63/497,371, filed on Apr. 20, 2023.

(51) Int. Cl.
*F24S 30/48* (2018.01)
*F24S 23/30* (2018.01)
*F24S 30/00* (2018.01)

(52) U.S. Cl.
CPC ............... *F24S 30/48* (2018.05); *F24S 23/31* (2018.05); *F24S 2030/131* (2018.05)

(58) Field of Classification Search
CPC ........ F24S 30/48; F24S 23/31; B25J 17/0266; B25J 9/06
See application file for complete search history.

(56) References Cited

U.S. PATENT DOCUMENTS 3,215,391 A * 11/1965 Storm .................. F16M 11/046 108/4
4,347,834 A * 9/1982 York ....................... F24S 30/48 126/688
(Continued)

FOREIGN PATENT DOCUMENTS

CN 104849844 A * 8/2015 ............. H02S 40/00
CN 112728785 A * 4/2021 ............... F03G 6/06
(Continued)

*Primary Examiner* — Jorge A Pereiro
(74) *Attorney, Agent, or Firm* — Christensen O'Connor Johnson Kindness PLLC

(57) ABSTRACT

An articulable solar concentrator assembly for solar power generation is provided. The assembly includes a base; a plurality of articulating joint arms rotatably pinned to the base at respective torque joints; and a lens assembly operably coupled to the base through the plurality of articulating joint arms. The lens assembly can have a plurality of semicircular lens sections arranged to form a circle and each including an array of arc reflectors. Each semicircular lens section can have a slot therebetween configured to receive one of the plurality of articulating joint arms during articulation. The lens assembly can include a receiver for receiving solar energy positioned at the focal point of the array of arc reflectors. The lens assembly can be configured to articulate in a complete hemispherical range of motion. Motors can be positioned at the torque joints to automate the articulation of the lens assembly.

20 Claims, 11 Drawing Sheets

(56) References Cited

U.S. PATENT DOCUMENTS

| | | | | | |
|---|---|---|---|---|---|
| 4,350,412 | A * | 9/1982 | Steenblik | F24S 23/80 126/684 |
| 4,651,589 | A * | 3/1987 | Lambert | B25J 18/06 52/646 |
| 5,002,379 | A * | 3/1991 | Murtha | F24S 23/80 359/853 |
| 5,153,780 | A * | 10/1992 | Jorgensen | F24S 23/80 359/853 |
| 5,699,695 | A | 12/1997 | Canfield et al. | |
| 6,418,811 | B1 * | 7/2002 | Rosheim | B25J 17/0266 901/29 |
| 6,808,344 | B2 * | 10/2004 | Chen | B25J 9/0069 409/235 |
| 7,622,666 | B2 * | 11/2009 | Hines | F24S 23/70 136/246 |
| 7,857,376 | B2 * | 12/2010 | Breidenbach | B62D 35/001 296/180.1 |
| 8,403,673 | B2 * | 3/2013 | Atluri | G09B 9/14 434/55 |
| 8,418,579 | B2 * | 4/2013 | Zhang | B25J 17/0266 74/490.04 |
| 8,627,738 | B2 * | 1/2014 | Breidenbach | B62D 35/004 74/469 |
| 9,234,681 | B2 * | 1/2016 | Tuli | F24S 23/79 |
| 10,436,182 | B2 | 10/2019 | Al-Maaitah et al. | |
| 10,895,406 | B1 * | 1/2021 | Halverson | G02B 19/0019 |
| 11,420,324 | B2 * | 8/2022 | Ootani | B25J 9/107 |
| 2002/0075579 | A1 * | 6/2002 | Vasylyev | F24S 23/74 126/684 |
| 2002/0139414 | A1 * | 10/2002 | Vasylyev | F24S 23/70 136/246 |
| 2010/0234844 | A1 * | 9/2010 | Edelhauser | A61B 17/62 606/56 |
| 2011/0056074 | A1 * | 3/2011 | Jonas | B23K 1/0016 29/829 |
| 2023/0071150 | A1 * | 3/2023 | Ramirez, III | F21S 11/005 |

FOREIGN PATENT DOCUMENTS

| | | | | | |
|---|---|---|---|---|---|
| DE | 10015465 | A1 * | 12/2001 | H02S 20/30 |
| EP | 0338555 | A1 * | 10/1989 | F24S 30/48 |
| EP | 1860387 | A1 * | 11/2007 | F24S 30/48 |
| ES | 2283233 | A1 * | 10/2007 | H02S 20/32 |
| ES | 2639583 | A2 * | 10/2017 | A61G 13/1205 |
| FR | 2477725 | A1 * | 9/1981 | H01Q 15/167 |
| FR | 2896847 | A1 * | 8/2007 | B25J 9/0072 |
| GB | 2344189 | A * | 5/2000 | F24S 30/40 |
| WO | WO-8703528 | A1 * | 6/1987 | B25J 9/1065 |
| WO | WO-9740966 | A1 * | 11/1997 | B25J 17/0266 |
| WO | WO-2006058386 | A1 * | 6/2006 | F24S 23/80 |
| WO | WO-2007088314 | A2 * | 8/2007 | B25J 17/0266 |
| WO | WO-2011087399 | A1 * | 7/2011 | F24S 23/75 |
| WO | WO-2014131124 | A1 * | 9/2014 | H10F 77/488 |

* cited by examiner

ARTICULABLE SOLAR CONCENTRATOR

CROSS-REFERENCE TO RELATED APPLICATIONS

This application claims priority to U.S. Provisional Patent Application No. 63/497,371, filed Apr. 20, 2023, the entire disclosure of which is hereby incorporated by reference in its entirety for all purposes.

BACKGROUND

There is a need to increase energy production as consumption demands grow, in part due to global population increases. Increasing energy demand requires clean and renewable energy sources while maintaining usability by the general public. Solar power is one of the most readily accessible energy sources and is responsible for approximately 3.4% of electricity generation in the United States. Solar power generation can be categorized as either photovoltaic or thermal, with the present majority of solar power generation being photovoltaic.

Thermal solar power generation has a subset referred to as concentrated solar power (CSP), where mirrors or lenses are used to redirect and concentrate sunlight into a receiver that drives a heat engine (e.g., a Stirling engine) connected to a generator to create electricity. Alternatively, thermal solar energy can be used to heat water in a solar collector, and can then be used for residential or commercial purposes.

Photovoltaic solar power generation has a subset referred to as concentrator photovoltaics, where mirrors or lenses concentrate sunlight into a powerful, high temperature photovoltaic cell to generate electricity. A Peltier device can be used with a solar concentrator to generate electric power (with sufficient rejection temperature) or similar thermoelectric modules (such as those commonly used in radioisotope thermoelectric generators) based on the thermocouple effect.

A well-known device for concentrating solar energy is a Fresnel lens, which can be discretized into a number of curved reflective surfaces or mirrors arranged in concentric circles. One Fresnel lens implementation is referred to as a Ring Array Concentrator (RAC) or ring array optical concentrator, which has been developed by Lucent Optics and SVV Technology Innovations, Inc, and apply a discretized Fresnel lens over concentric rings that focus light down into a central focal point. Wahaj Solar has developed a design for a RAC that requires a relatively large structure and corresponding drive motor systems, has a fixed focal point (and spot size), and is restricted to limited storage positions based on wind. The optimal RAC approach requires that no shading or blocking of solar rays is present on each reflector ring or from the adjacent reflector rings. An example of the Wahaj Solar RAC is shown and described in U.S. Pat. No. 10,436,182. Each of the concepts described in this paragraph use a Fresnel lens as the basis of their design and are not suitable for applications where articulation is necessary to increase performance of the solar concentrator. For example, the Wahaj Solar RAC only has one axis of articulation and one axis of rotation at the base that is aligned the center of the circular lens. This degree of articulation limits the performance and control of the devices.

Concentrated solar power is dependent on solar tracking to maintain the proper angles of incidence, typically optimized at 90°, and reflection to generate meaningful amounts of energy. Many current technology solar tracking systems employ 1- or 2-axis tracking. Some joint and articulation configurations exist that improve tracking capabilities over a wider range of angles of the solar concentrator. One example of a joint having complete hemispherical tracking is shown and described in U.S. Pat. No. 5,699,695. This type of joint is often referred to as a Canfield joint, which can be modified to operate with rotational inputs at the basal plate connections with the articulating arms.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Figure 1A:
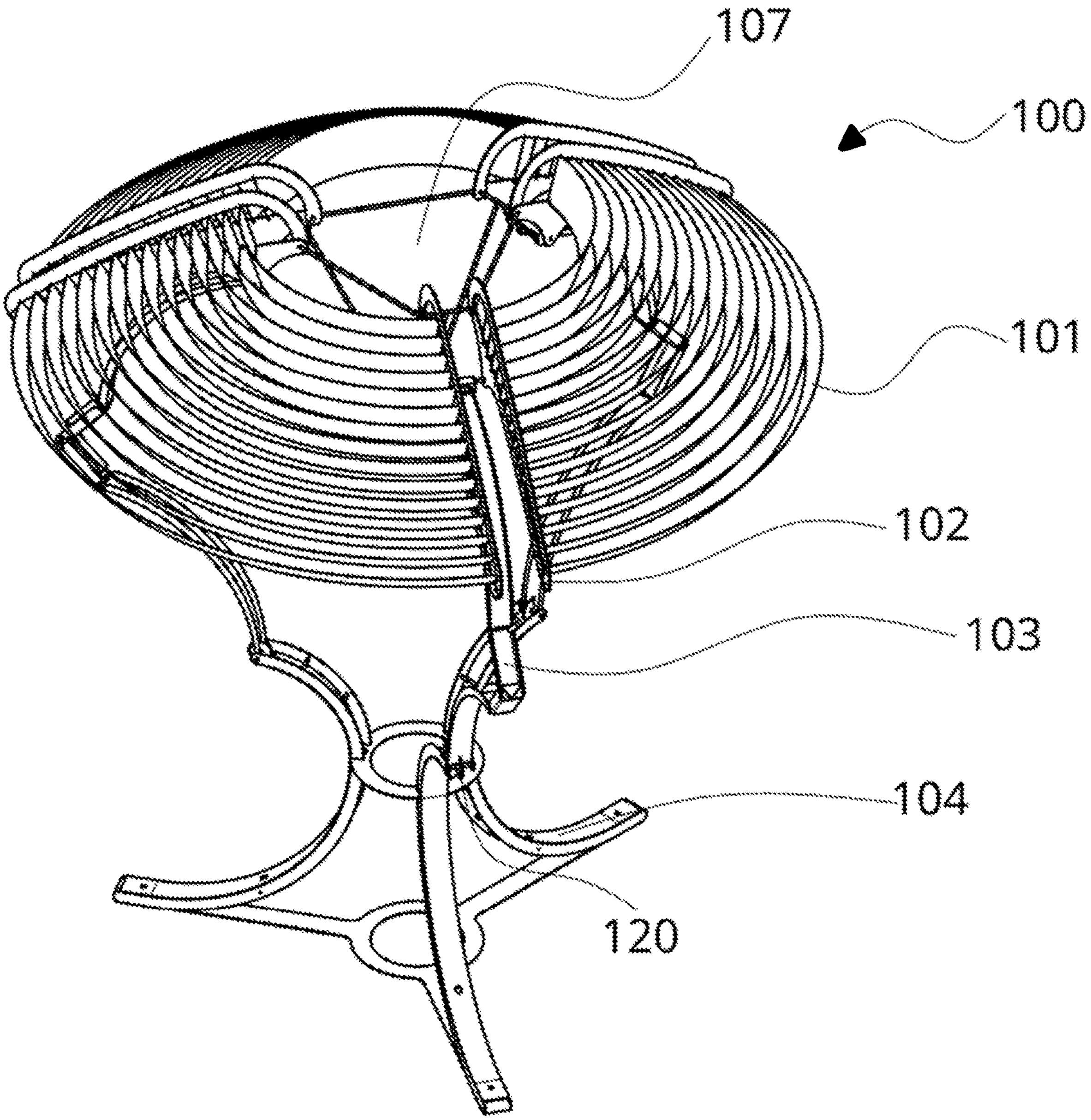
FIG. 1A is a perspective view of an articulable solar concentrator, in accordance with embodiments of the present disclosure.

As will be described in more detail below, the present disclosure provides examples of an articulable solar concentrator having linear- or parabolic-faced, concentric rings that focus sunlight into a designed focal area. The lens of the embodiments described herein can be configured to create a focal point of solar energy. In this regard, the focal point can be adjusted to focus on a pinpoint, a flat disc, a tall cylinder-shaped object, or the like.

Although embodiments of the present disclosure may be described with reference to solar concentrator assemblies, one skilled in the relevant art will appreciate that the disclosed embodiments are illustrative in nature and therefore should not be construed as limited to such an application. It should therefore be apparent that the disclosed technologies and methodologies have wide application, and therefore may be suitable for use with many types of controllable and articulable concentrator arrangements, including pressure waves (e.g., sound waves), electromagnetic radiation (e.g., radio waves), and the like, and/or can be used on different terrain, such as on the lunar surface.

Accordingly, the following descriptions and illustrations herein should not limit the scope of the claimed subject matter.

The articulable solar concentrator includes rings that can be articulated and actuated in various degrees of freedom by way of an articulation system coupled to a base. In some embodiments, the articulation system can be configured as a six-axis articulating joint that can be driven by one or more motors. Although the FIGURES and description are directed to an articulation system having six axes of freedom, in other embodiments the articulable solar concentrator may have fewer than six axes of freedom, such as five, four, etc.

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

The articulation system of the articulating solar concentrator can be controlled based on signals from a solar sensor, for example, to maintain the proper angles of incidence with the sun, typically optimized at 90°. Alternatively, control of the position of the rings can be manual, such as when electrical power is disconnected from the motorized articulation system. The power supply for the motors of the articulation system can be DC voltage via solar power, a battery, and/or an A/C power supply (e.g., from a standard A/C outlet at 110 VAC, 220 VAC, etc.). In embodiments having a battery, a portion of the solar power harnessed by the articulable solar concentrator can be used to charge and float the voltage of the battery.

Embodiments of the articulable solar concentrator described herein are intended to improve manufacturability and deployment/installation. The configurations of the present disclosure can be utilized in both first-world (e.g., recreational/commercial power) and developing countries (e.g., heat for cooking and electricity for light and general power consumption/storage). Use cases of the present technology include utility scale power generation, municipality water heating, consumer water heating, consumer power generation, and lunar power generation/process heat generation, among other use cases. In configurations with larger arrays, a receiver can be arranged to heat salt mixtures and circulate the heated salt mixture in power conversion systems for electricity generation, or can use the heated salt mixture as a thermal battery. In embodiments intended to heat water, the solar concentrator can either directly heat the water or use heat transfer from another coolant, e.g., salt. In other embodiments, the solar concentrator can have a receiver that includes a photovoltaic cell configured to generate electricity based on the solar energy. In any given installation location, solar tracking can be accomplished using sensors or by using preprogrammed rotation inputs mapped to the position of the sun on a given day and location. The full hemispherical articulation of the embodiments disclosed herein is expected to increase efficiency of the solar concentrators, and allows use cases where the concentrator can maintain full uptime solar tracking at certain locations near the lunar poles. Lunar concentrator arrays could act as a thermal energy source for projects involving processing of lunar regolith or provide electricity using a concentrator photovoltaic receiver.

The solar lens assembly can be a discretized Fresnel lens broken up into multiple concentric rings with linear faces. The embodiments described herein can be configured (e.g., by software) for any desired power output level, where the system of rings is generated based on output level. These rings can be arranged in three segments, with each ring cut from sheetmetal stock (e.g., stainless steel sheetmetal) and compressed in between support brackets that allow the rings to retain their curved shape. In other embodiments, the parabolic rings have a parabolic cross-section to increase concentration at the point on the receiver. Gaps in between each segment of rings allow clearance for the six-axis articulating joint arms. Embodiments of the present disclosure allow the concentrating rings to achieve a hemispherical range of motion in a relatively small design envelope.

The articulation and actuation of the ring arrangement is handled via a six-axis joint that is sized to meet the power level requirements set forth in the design of the system. The six-axis joint can be configured to articulate with high resolution, making it a suitable for deployment in any location. Utilization of the six-axis joint allows full hemispherical range of motion while embodiments having a collapsible base (see FIGS. 4A-4D) are configured to fold for more convenient storage or transit.

FIGS. 1A-ID show an articulable solar concentrator assembly 100 ("assembly 100"), in accordance with embodiments of the present disclosure. The assembly 100 can include a discretized Fresnel lens assembly ("DFL assembly") having three semicircular lens sections of arc reflectors 101 (e.g., flat metal arcs from stainless steel sheet metal) that are bent into a funnel shape. The semicircular lens sections are arranged in a circle to form the DFL assembly. The individual arc reflectors 101 can be spaced apart from one another and supported by a support arm assembly 102, which will be described in greater detail below with reference to FIG. 4. In some embodiments, components of the support arm assembly 102 can be made from flat sheet metal (e.g., stainless steel), or can be formed by any other suitable manufacturing method, and can be shaped in such a way that the DFL assembly can articulate through the intended range of motion. The segmented configuration of the DFL assembly into three sections of arrays of arc reflectors 101 allows clearance for articulation of the DFL assembly by including a slot between each of the support arm assemblies 102 at the terminal ends of the three semicircular lens sections. In other embodiments, the DFL assembly can have fewer or greater than three sections of arc reflectors 101.

Figure 1B:
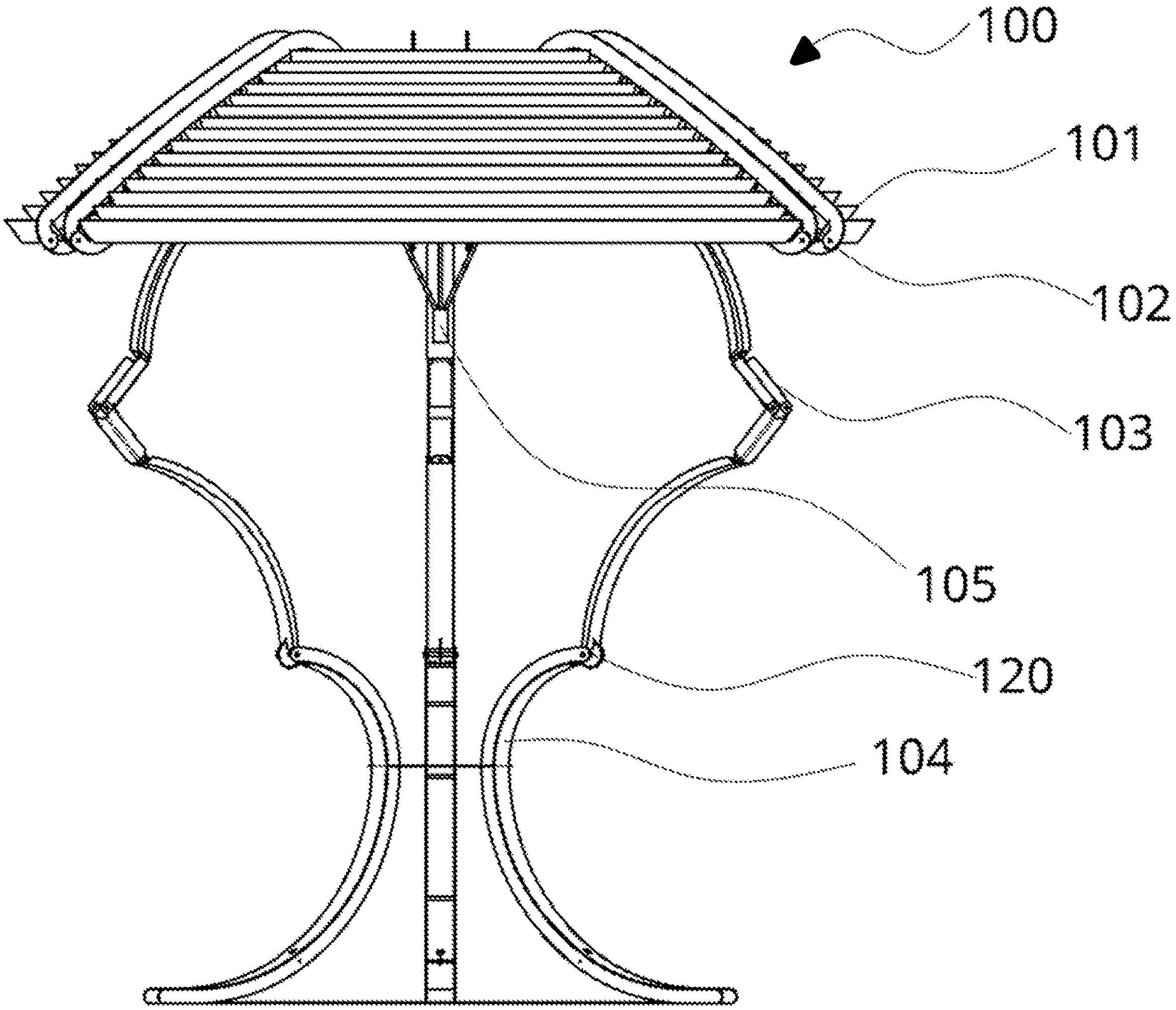
FIG. 1B is a side view of the articulable solar concentrator of FIG. 1A.
Figure 1C:
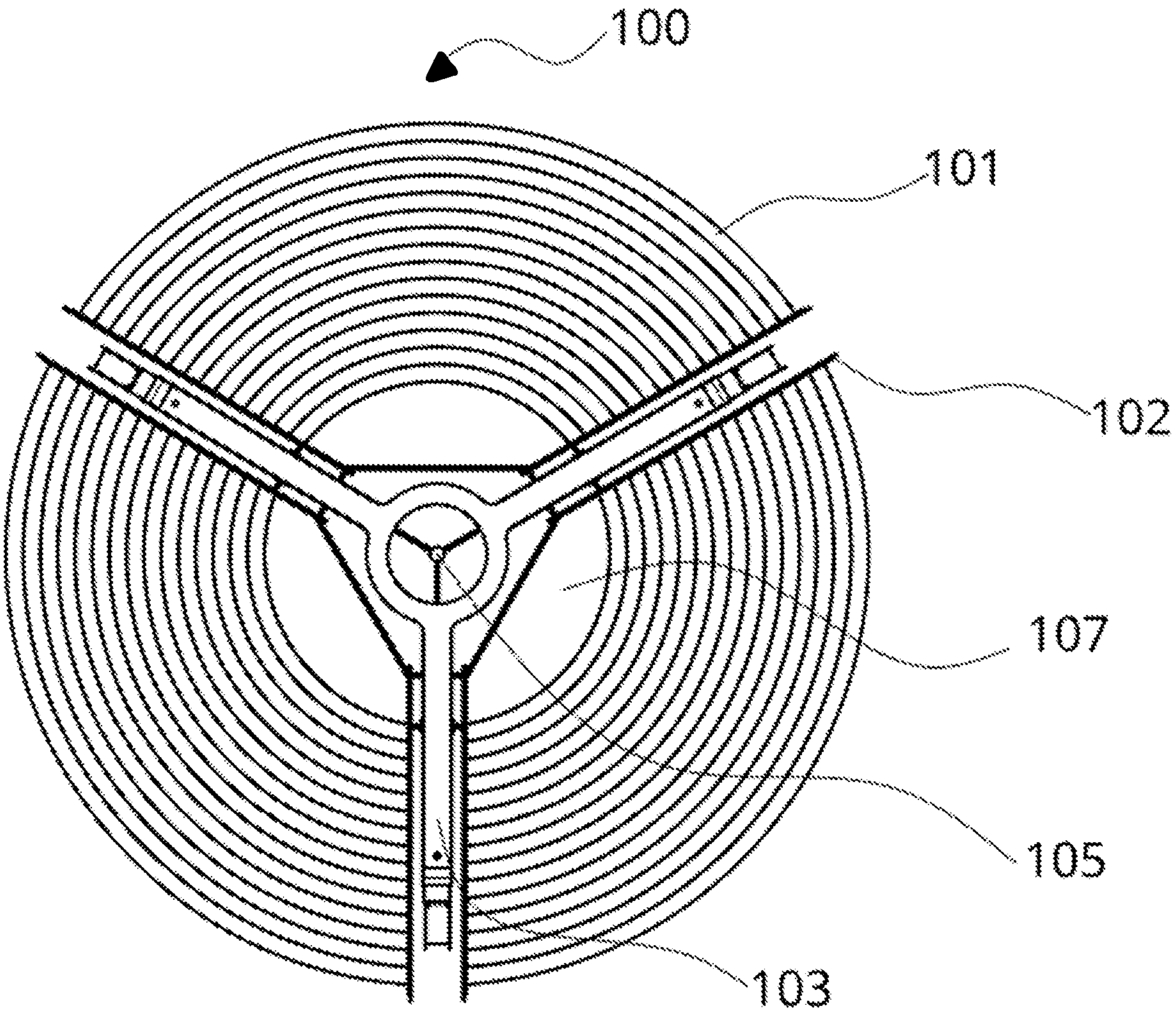
FIG. 1C is a top view of the articulable solar concentrator of FIG. 1A.

As shown in FIGS. 1A and 1C, the DFL assembly can have an open inner ring 107 central to the innermost arc reflectors 101 where a photovoltaic cell or traditional Fresnel lens could be added to the assembly 100. In some embodiments, a photovoltaic cell is positioned within the open inner ring 107 and configured to supply power to the assembly 100 for articulation (e.g., through one or more motors as will be described in detail below). In other embodiments, a Fresnel lens is positioned within the open inner ring 107 and configured to further concentrate light to a receiver 105 (FIGS. 1B-1D) positioned below it. During use of the assembly 100, sunlight is concentrated into the receiver 105 positioned at the focal point of the arc reflectors 101. The receiver 105 can be a high-temperature concentrator photovoltaic cell, which generates electricity based on receiving solar energy. In other embodiments, the receiver 105 can contain a salt mixture which serves as a thermal battery and powers a heat engine (e.g., a Stirling cycle engine) to generate electricity, or serves as a thermal energy source for a water heater. In further embodiments, the receiver 105 can directly heat water for a home or municipality. In an alternate embodiment, the receiver 105 contains optical fibers that transfer light to another location for processing, or the receiver 105 is a solar furnace that can be used for cooking or pyroprocessing.

The DFL assembly can be articulable with respect to a base 104 of the assembly 100 through a plurality of articulating joint arms 103. The articulating joint arms 103 can be intermediately hinged and can be received within the slots between each of the support arm assemblies 102 during articulation of the DFL assembly through the intended range of motion (e.g., a complete hemispherical range of motion) with respect to the base 104. The articulating joint arms 103 can be pinned to the base 104 at a torque joint 120 and pinned to the support arm assemblies 102 at a mounting boss 114 (see FIG. 4). In some embodiments, the torque joint 120 is motorized such that articulation of the DFL assembly can be automated or otherwise controlled by a control system that sends signals to the motors. In other embodiments, the torque joint 120 can provide resistance for manual positioning of the DFL assembly.

Figure 1D:
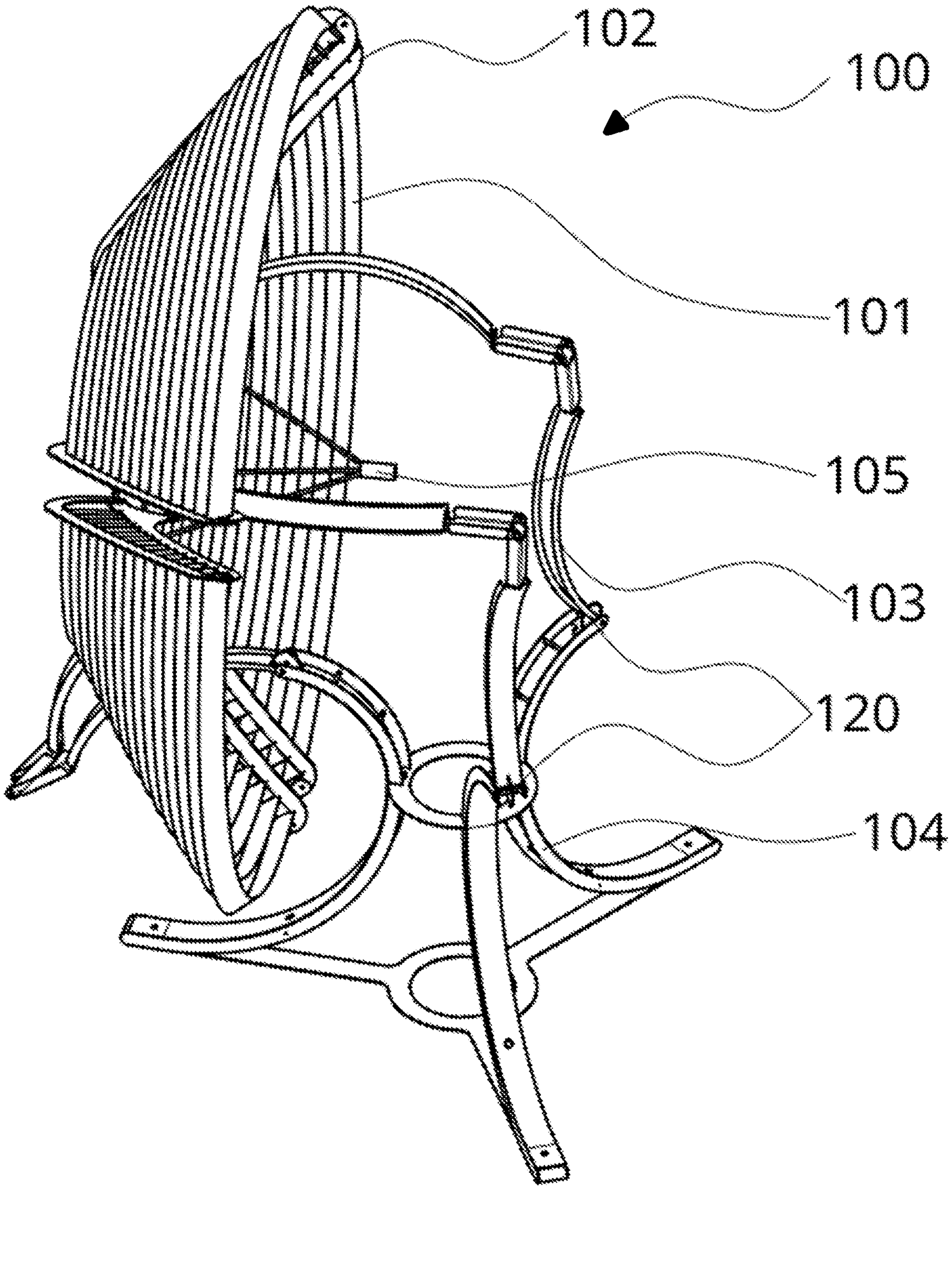
FIG. 1D is a perspective view of the articulable solar concentrator of FIG. 1A, showing the solar concentrator in an articulated position.

During articulation of the DFL assembly, the articulating joint arms 103 can rotate (motorized or manually) at the torque joints 120 with respect to the base 104, and can extend or collapse at their respective intermediate hinges. As shown in FIG. 1D, for example, two of the three articulating joint arms 103 (e.g., the two articulating joint arms 103 to the right side of the assembly 100 in the orientation of FIG. 1D) are in a generally extended state to allow the DFL assembly to articulate to about 90° from vertical, while the third of the three articulating joint arms 103 (e.g., the articulating joint arm 103 to the left side of the assembly 100 in the orientation of FIG. 1D) are in a generally collapsed state and received in the slot between two support arm assemblies 102 at the edges of two of the sections of arrays of arc reflectors 101. In other positions of the DFL assembly, two of the three articulating joint arms 103 may be in the generally collapsed state while the third of the three articulating joint arms 103 is in the generally extended state.

Figure 4:
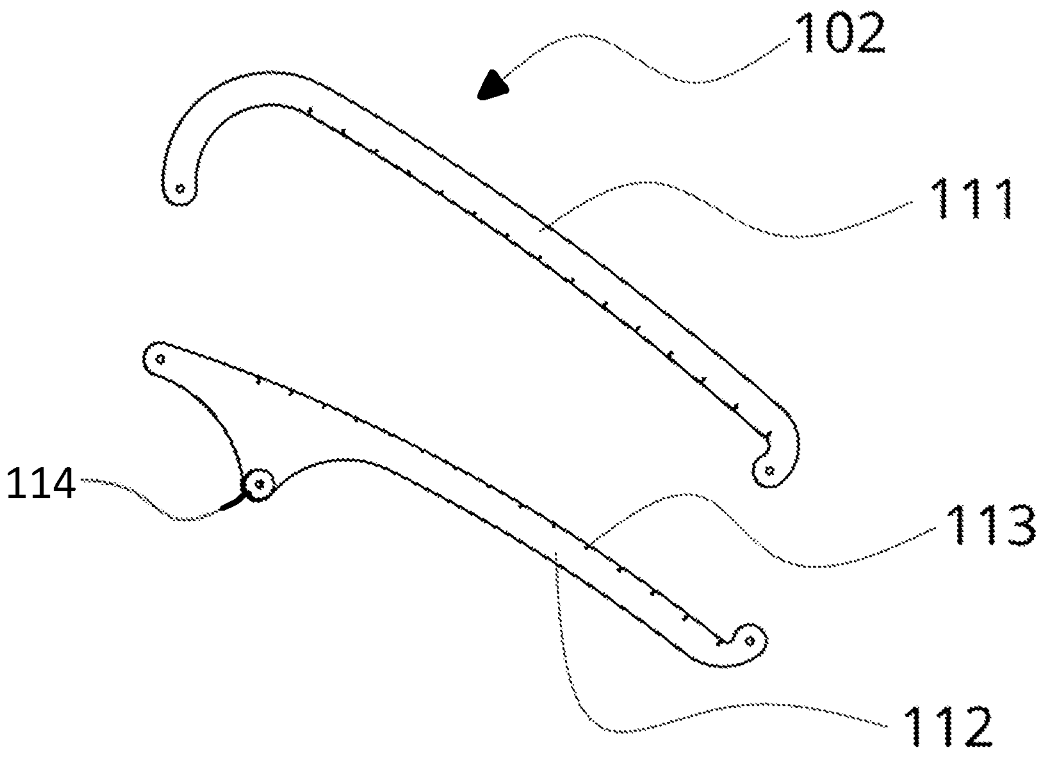
FIG. 4 is a view of a top support arm and a bottom support arm configured for use with sections of a discretized Fresnel lens, in accordance embodiments of the present disclosure.

The shape of the articulating joint arms 103 can be generally dictated by the mounting boss 114 of the support arm assemblies 102. As shown in FIG. 4, the support arm assemblies 102 can include an upper support arm portion 111 and a lower support arm portion 112. Each of the upper and lower support arm portions 111 and 112 can include a plurality of corresponding notches 113 that can be self-locating to allow positioning of the edges of the arc reflectors 101 within the notches 113 in the upper and lower support arm portions 111 and 112 to retain the spacing from the other arc reflectors 101 in the array configuration. As shown in FIG. 4, the distal and terminal ends of the upper and lower support arm portions 111 and 112 can be operably coupled together to retain the arc reflectors 101 therebetween.

Figure 2A:
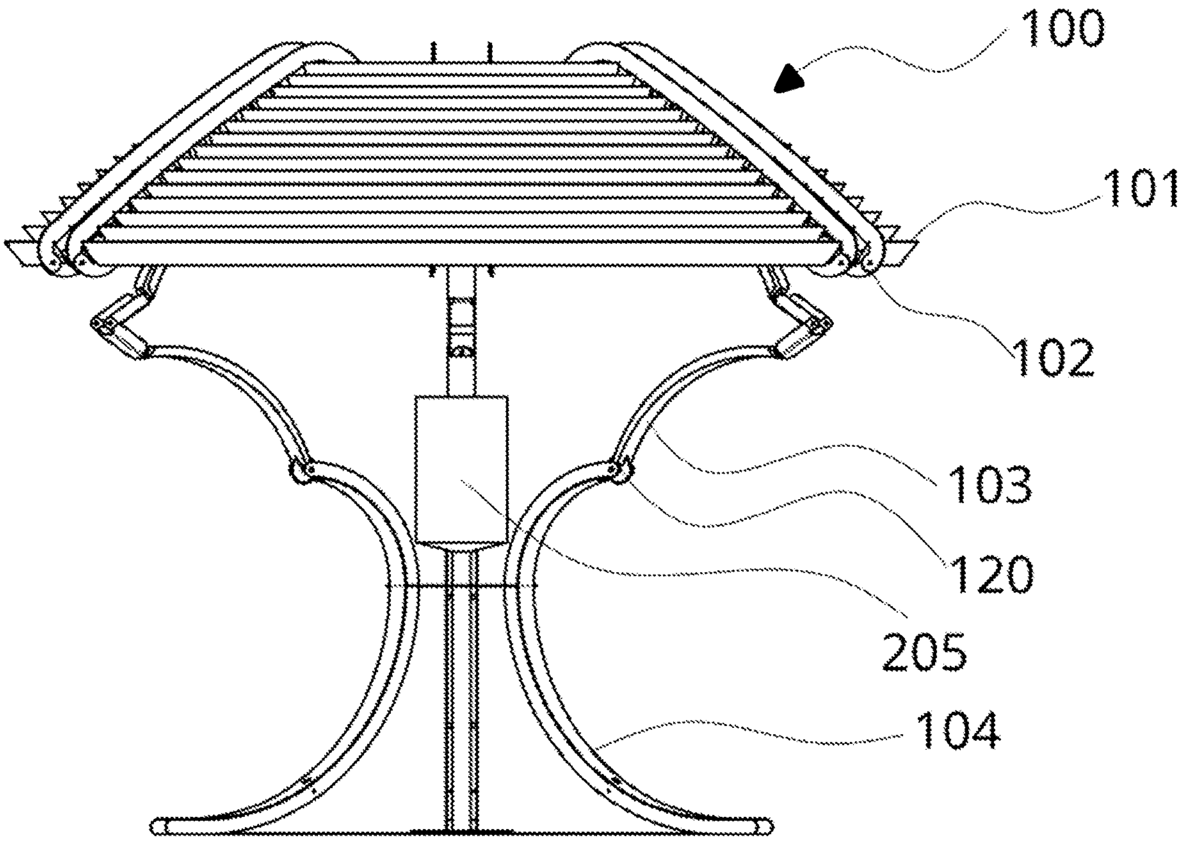
FIG. 2A is a side view of the articulable solar concentrator of FIG. 1A, having a static fixture in accordance with embodiments of the present disclosure.

FIG. 2A shows an embodiment of the assembly 100 having a non-articulating receiver 205 instead of the receiver 105 shown in FIGS. 1B-1D that articulates with the DFL assembly (see FIG. 1D for an articulated position). In some embodiments, the non-articulating receiver 205 is positioned at the focal point of the array when plunge of the DFL assembly through the articulating joint arms 103 remains constant; however, if the plunge level changes, variable focal sizes of the non-articulating receiver 205 can be dynamically achieved during use. For example, plunge through the articulating joint arms 103 can lower the structure of the assembly 100 close to or on the ground to facilitate assembly, maintenance, and/or safe storage in high winds or under other adverse environmental conditions.

Figure 2B:
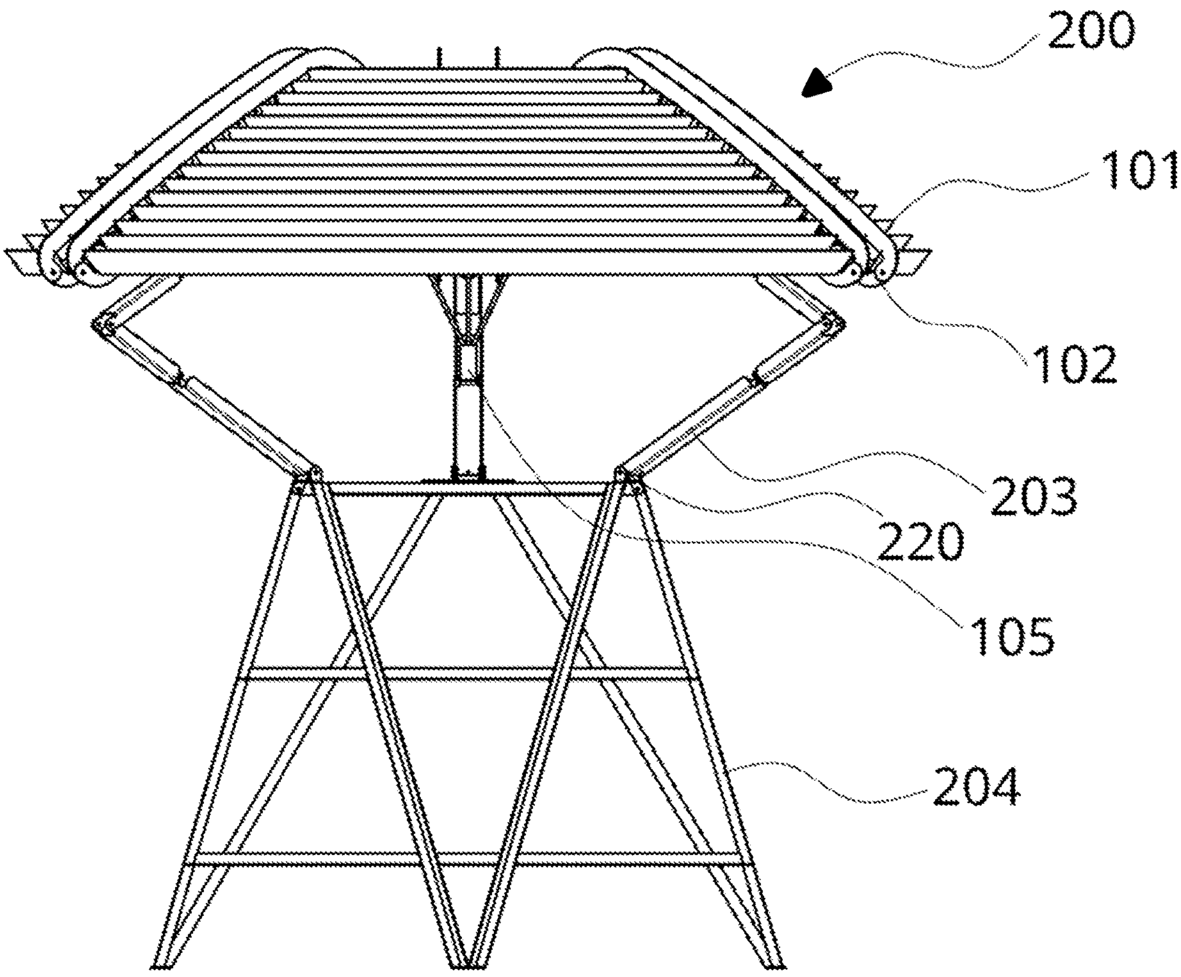
FIG. 2B is a side view of an articulable solar concentrator having a base configured to support heavy solar array heads, in accordance with embodiments of the present disclosure.

FIG. 2B shows an articulable solar concentrator assembly 200 ("assembly 200") having a trussed support base 204 configured to support heavy DFL assemblies, in accordance with embodiments of the present disclosure. The assembly 200 can include articulating joint arms 203 configured to articulate the DFL assembly through the intended range of motion. The articulating joint arms 203 can be pinned at torque joints 220 to the trussed support base 204. In some embodiments, the torque joint 220 is motorized such that articulation of the DFL assembly can be automated or otherwise controlled by a control system that sends signals to the motors. In other embodiments, the torque joint 220 can provide resistance for manual positioning of the DFL assembly.

FIGS. 3A-3D show an articulable solar concentrator assembly 300 ("assembly 300") having a collapsible base assembly 304 in an unfolded configuration (FIGS. 3A and 3B) and in a folded configuration (FIG. 3C), in accordance with embodiments of the present disclosure. The assembly 300 can include a DFL assembly having a plurality of arc reflectors 301 in three sections, support arm assemblies 302, and articulating joint arms 303. The coupling between the articulating joint arms 303 and the collapsible base assembly 304 can be detachable such that the collapsible base assembly 304 can be removed from the DFL assembly. The collapsible base assembly 304 can be configured to operably couple to the articulating joint arms 303 to carry the support arm assemblies 302 and thereby the DFL assembly with the arc reflectors 301. The collapsible base assembly 304 can be manufactured from bent sheet metal (e.g., stainless steel sheet metal). The collapsible base assembly 304 can include an unfolded configuration (FIGS. 3A and 3B) for use when supporting the DFL assembly, and a folded configuration (FIG. 3C) for portability, e.g., during storage or transit.

Figure 3A:
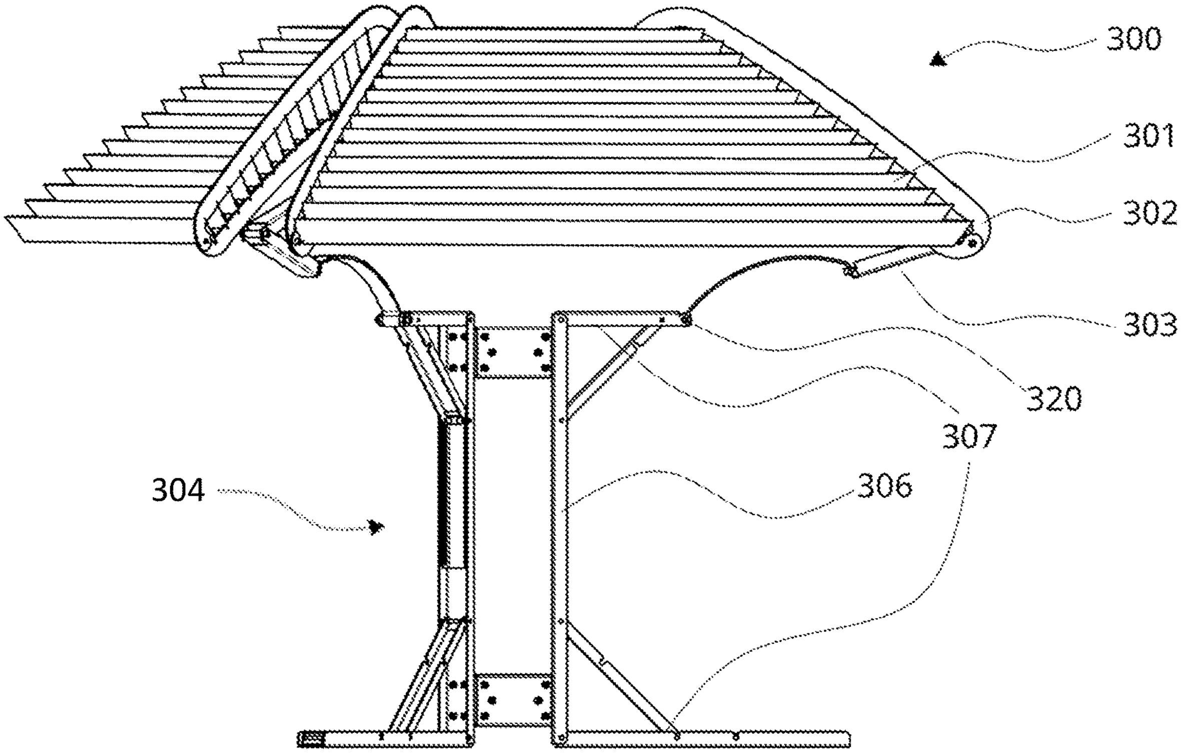
FIG. 3A is a side view of an articulable solar concentrator having a collapsible base in an unfolded configuration, in accordance with embodiments of the present disclosure.
Figure 3B:
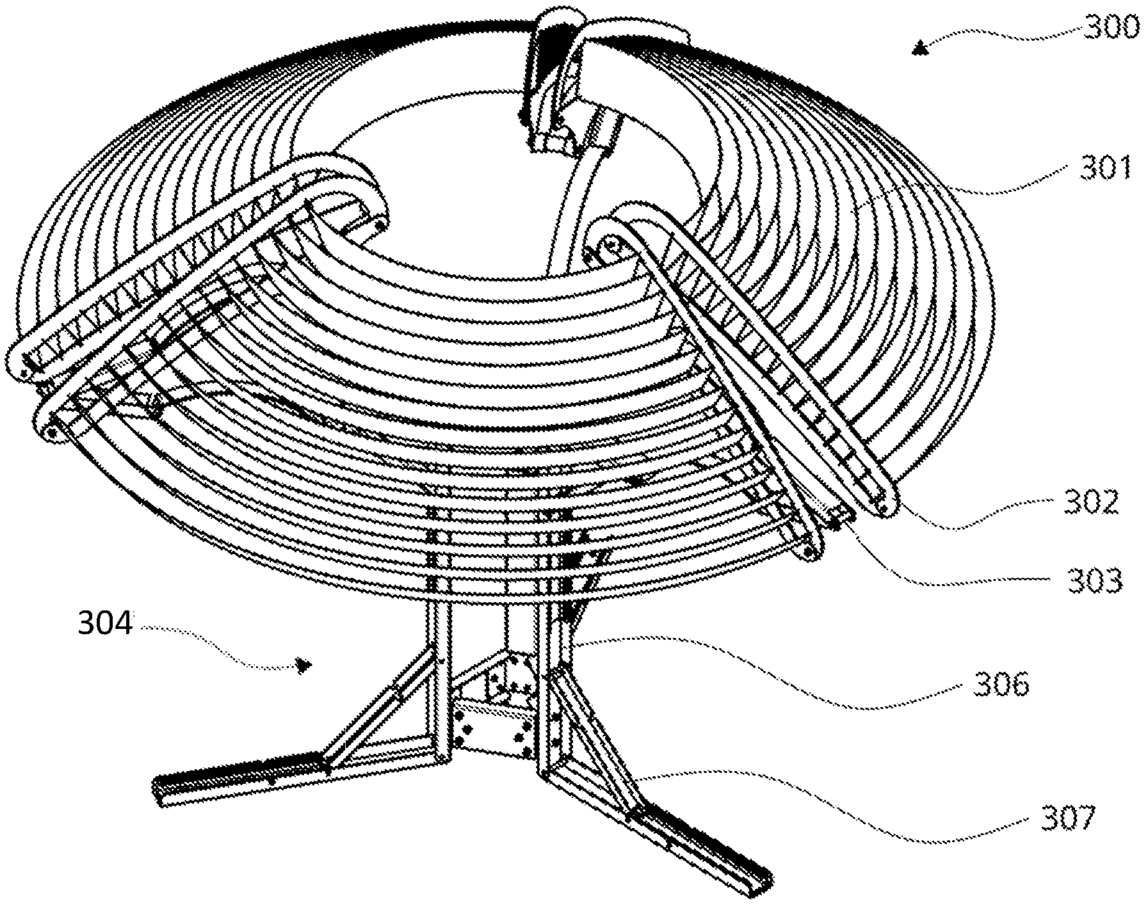
FIG. 3B is a perspective view of the articulable solar concentrator of FIG. 3A.
Figure 3C:
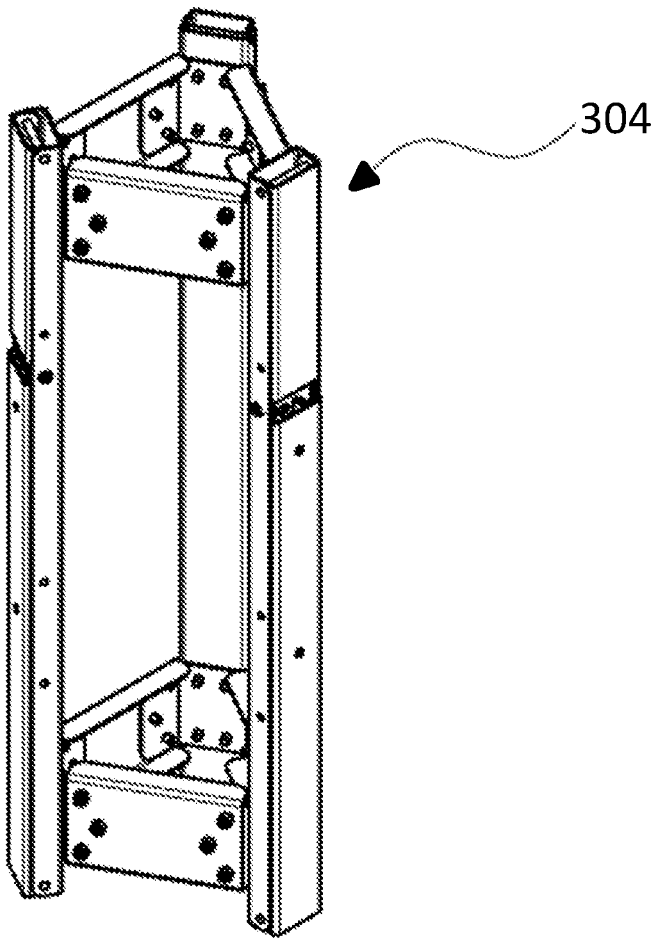
FIG. 3C is a perspective view of a collapsible base of the articulable solar concentrator of FIG. 3A, shown in a folded configuration.
Figure 3D:
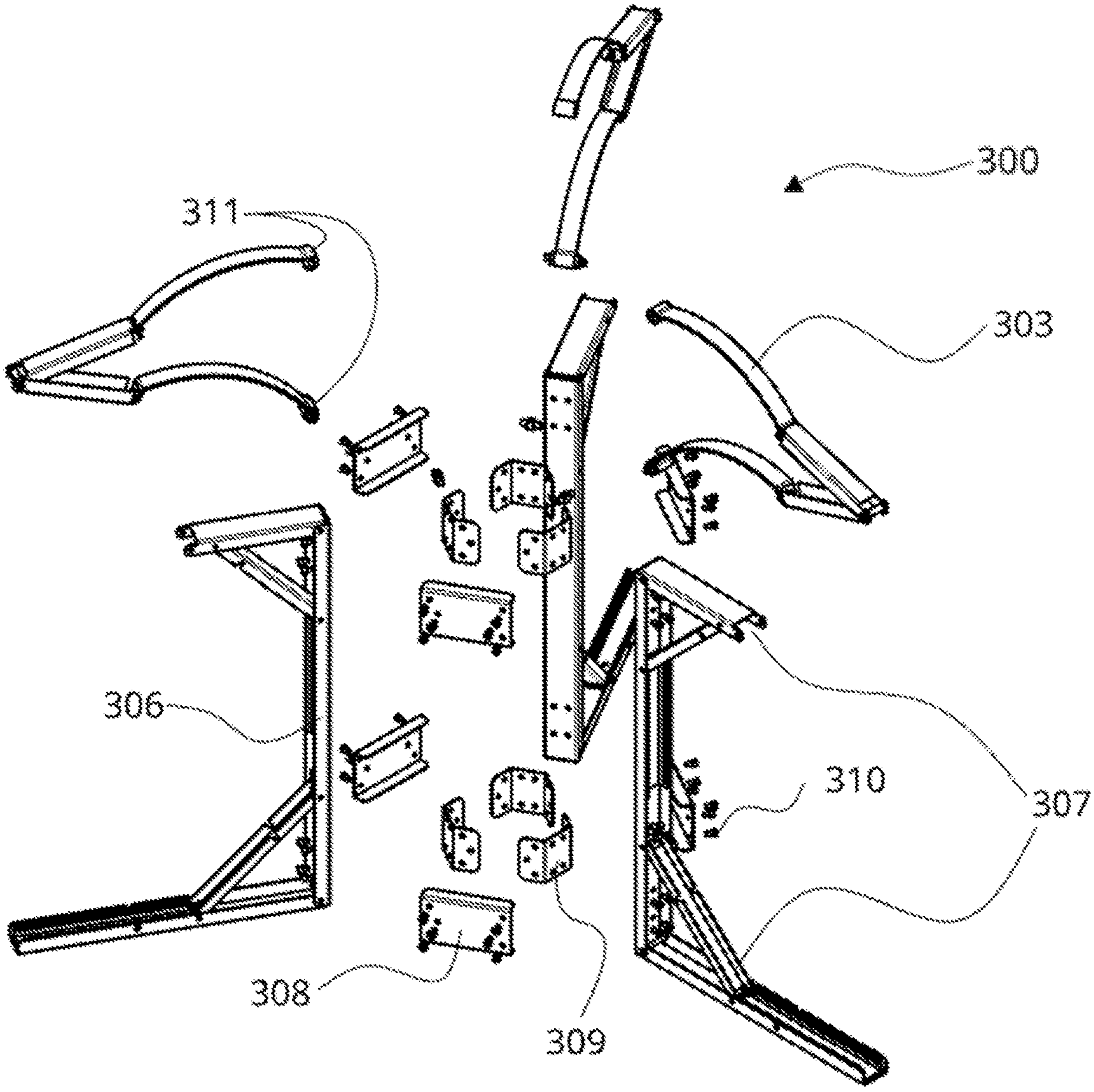
FIG. 3D is an exploded perspective view of the articulable solar concentrator of FIG. 3A.

As shown in FIG. 3D, the assembly 300 can include rotary dampers 311 configured to reduce the step impulse delivered to the articulating joint arms 103 through their respective drive mechanisms (not shown). In some embodiments, the drive mechanisms can include electric motors (e.g., servo motors, stepper motors, etc.), motor control units, power sources, and other components to control the articulation of the assembly 300.

The collapsible base assembly 304 can include legs 307, e.g., three legs 307 as shown in the illustrated embodiment. The legs 307 can include the detachment location features 307 that are configured to fold down into a channel 306 of the legs 307. The legs 307 also have a bottom portion that can be configured to fold up into the channel 306 of the legs 307. The collapsible base assembly 304 can further include a plurality of first base bracket portions 308 and second base bracket portions 309, each of which can be sheet metal brackets (e.g., stainless steel sheet metal), and can be configured to operably couple to the upper and lower portions of the legs 307. The components of the collapsible base assembly 304 can be operably coupled using one or more fasteners 310, e.g., stainless-steel bolts, nuts, washers, etc.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure.

Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The invention claimed is:

1. An articulable solar concentrator assembly for solar power generation, the articulable solar concentrator assembly comprising:

- a base;
- a plurality of articulating joint arms rotatably pinned to the base at respective torque joints;
- a lens assembly operably coupled to the base through the plurality of articulating joint arms, the lens assembly having:
  - a first semicircular lens section including a first plurality of arc reflectors arranged in a first array and having a first pair of lens support arm assemblies positioned at terminal ends of the first plurality of arc reflectors;
  - a second semicircular lens section including a second plurality of arc reflectors arranged in a second array and having a second pair of lens support arm assemblies positioned at terminal ends of the second plurality of arc reflectors; and
  - a third semicircular lens section including a third plurality of arc reflectors arranged in a third array and having a third pair of lens support arm assemblies positioned at terminal ends of the third plurality of arc reflectors,
  - wherein the first, second, and third semicircular lens sections are arranged to form a circle, with each semicircular lens section having a slot between the lens support arm assemblies of adjacent semicircular lens sections; and
- a receiver for receiving solar energy positioned at the focal point of the first, second, and third plurality of arc reflectors,
- wherein the lens assembly is configured to articulate in a range of motion with respect to the base by movement of the plurality of articulating joint arms, and wherein, during articulation positions in at least some of the range of motion, at least one of the plurality of articulating joint arms is received within the respective slots between the lens support arm assemblies of adjacent semicircular lens sections.

2. The articulable solar concentrator assembly of claim 1, wherein the lens assembly is a discretized Fresnel lens.

3. The articulable solar concentrator assembly of claim 1, wherein the range of motion is a complete hemispherical range of motion.

4. The articulable solar concentrator assembly of claim 1, wherein the plurality of articulating joint arms are configured to articulate the lens assembly in six-axes relative to the base.

5. The articulable solar concentrator assembly of claim 1, wherein the plurality of articulating joint arms comprises three articulating joint arms each rotatably pinned to the lens support arm assemblies of adjacent semicircular lens sections and positioned aligned with the respective slot.

6. The articulable solar concentrator assembly of claim 1, wherein the receiver is rigidly coupled to the lens assembly such that the receiver articulates with the lens assembly with respect to the base.

7. The articulable solar concentrator assembly of claim 1, wherein the receiver is isolated from the lens assembly such that the receiver is non-articulating with respect to the base.

8. The articulable solar concentrator assembly of claim 1, wherein the plurality of articulating joint arms are intermediately hinged such that the plurality of articulating joint arms can be positioned between an extended state and a collapsed state during articulation of the lens assembly with respect to the base.

9. The articulable solar concentrator assembly of claim 1, further comprising a motor positioned at each of the torque joints, wherein the motors are configured to rotate the plurality of articulating joint arms to articulate the lens assembly with respect to the base.

10. The articulable solar concentrator assembly of claim 9, wherein the articulation of the lens assembly with respect to the base is controlled by a solar sensor that is configured to transmit solar tracking information to the motors to maintain an angle of incidence on the lens assembly of about 90°.

11. The articulable solar concentrator assembly of claim 1, wherein each of the first, second, and third pair of lens support arm assemblies comprise an upper support arm portion and a lower support arm portion, wherein each of the upper and lower support arm portions have corresponding notches to position the arc reflectors in a spaced apart array configuration between the upper and lower support arm portions.

12. The articulable solar concentrator assembly of claim 1, wherein the receiver is a high-temperature concentrator photovoltaic cell, a salt mixture thermal battery, a water heating element, optical fiber elements, or a solar furnace.

13. The articulable solar concentrator assembly of claim 1, wherein the base is a collapsable base assembly, comprising:

a plurality of folding legs rotatably pinned at the respective torque joints to the plurality of articulating joint arms;

a plurality of channels for receiving each of the folding legs in a folded configuration of the collapsable base; and bracket portions to operably couple the plurality of folding legs together.

14. The articulable solar concentrator assembly of claim 1, wherein the plurality of articulating joint arms are configured to joint plunge such that lens assembly can create an adjustable focal point of solar energy, and wherein the focal point can be adjusted to focus on a pinpoint, a flat disc, a tall cylinder-shaped object, or the like.

15. An articulable solar concentrator assembly for solar power generation, the articulable solar concentrator assembly comprising:

a base;

a plurality of articulating joint arms rotatably pinned to the base at respective torque joints;

a lens assembly operably coupled to the base through the plurality of articulating joint arms, the lens assembly having a plurality of semicircular lens sections each including an array of arc reflectors and a pair of lens support arm assemblies positioned at terminal ends of each array of arc reflectors, wherein the plurality of semicircular lens sections are arranged to form a circle, with each semicircular lens section having a slot between the lens support arm assemblies of adjacent semicircular lens sections; and a receiver for receiving solar energy positioned at the focal point of the array of arc reflectors, wherein the lens assembly is configured to articulate in a complete hemispherical range of motion with respect to the base by movement of the plurality of articulating joint arms, and wherein, during articulation positions in at least some of the range of motion, at least one of the plurality of articulating joint arms is received within the respective slots between the lens support arm assemblies of adjacent semicircular lens sections.

16. The articulable solar concentrator assembly of claim 15, wherein the lens assembly is a discretized Fresnel lens.

17. The articulable solar concentrator assembly of claim 15, wherein the receiver is rigidly coupled to the lens assembly such that the receiver articulates with the lens assembly with respect to the base.

18. The articulable solar concentrator assembly of claim 15, wherein the plurality of articulating joint arms are intermediately hinged such that the plurality of articulating joint arms can be positioned between an extended state and a collapsed state during articulation of the lens assembly with respect to the base.

19. The articulable solar concentrator assembly of claim 15, further comprising a motor positioned at each of the torque joints, wherein the motors are powered by a photovoltaic cell coupled to the articulable solar concentrator assembly, and wherein the motors are configured to rotate the plurality of articulating joint arms to articulate the lens assembly with respect to the base.

20. The articulable solar concentrator assembly of claim 19, wherein the articulation of the lens assembly with respect to the base is controlled by a solar sensor that is configured to transmit solar tracking information to the motors to maintain an angle of incidence on the lens assembly of about 90°.

* * * * *